United States Patent
Tappe

(10) Patent No.: US 8,360,092 B2
(45) Date of Patent: Jan. 29, 2013

(54) BALL VALVE MADE OF PLASTIC

(75) Inventor: Michael Tappe, Duesseldorf (DE)

(73) Assignee: Andreas Bersch, Modautal (DE), part interest ( * ) Notice: Subject to any disclaimer, the term of this patent is extended or adjusted under 35 U.S.C. 154(b) by 387 days.

(21) Appl. No.: 12/601,395

(22) PCT Filed: May 20, 2008

(86) PCT No.: PCT/EP2008/056164
§ 371 (c)(1),
(2), (4) Date: May 20, 2010

(87) PCT Pub. No.: WO2008/142071
PCT Pub. Date: Nov. 27, 2008

(65) Prior Publication Data
US 2011/0198526 A1 Aug. 18, 2011

(30) Foreign Application Priority Data

May 24, 2007 (DE) .......................... 10 2007 024 623
May 24, 2007 (DE) .......................... 10 2007 024 624
May 24, 2007 (DE) .......................... 10 2007 024 625

(51) Int. Cl.
*F16K 5/06* (2006.01)
(52) U.S. Cl. ..................................... 137/375; 251/315.1
(58) Field of Classification Search .................. 137/375; 251/315.01–315.16
See application file for complete search history.

(56) References Cited

U.S. PATENT DOCUMENTS

| | | | |
|---|---|---|---|
| 3,334,650 A * | 8/1967 | Stewart, Jr. et al. | .......... 137/375 |
| 3,656,711 A | 4/1972 | Toelke | |
| 3,671,010 A * | 6/1972 | Scaramucci | .................. 251/151 |
| 4,553,562 A * | 11/1985 | Nakada | .......................... 137/375 |
| 4,635,674 A | 1/1987 | Bajka | |
| 4,667,926 A | 5/1987 | Takeda et al. | |
| 4,869,450 A * | 9/1989 | Takeda et al. | ............. 251/315.05 |
| 4,940,208 A | 7/1990 | Kemp | |
| 5,076,542 A * | 12/1991 | Ottens et al. | ............. 251/315.15 |

(Continued)

FOREIGN PATENT DOCUMENTS

| | | |
|---|---|---|
| DE | 2342069 A1 | 2/1974 |
| DE | 2829286 A1 | 1/1980 |

(Continued)

OTHER PUBLICATIONS

International Search Report of the International Searching Authority from corresponding Patent Cooperation Treaty (PCT) Application No. PCT/EP2008/056164, mailed Aug. 11, 2008.

(Continued)

*Primary Examiner* — John Bastianelli
(74) *Attorney, Agent, or Firm* — Gardner, Linn, Burkhart & Flory, LLP

(57) ABSTRACT

The invention relates to a ball valve having a housing made of plastic in which a carrier structure is disposed that is encased in plastic in which a valve ball having a through opening is pivotally supported between an opening and closing position, said carrier structure comprising two carrier rings positioned opposite each other, and a connecting element connecting said carrier rings. In order to create a ball valve made of plastic that is characterized by a simple construction and improved impermeability, the invention provides for the carrier structure to separate the valve ball completely from the plastic of the housing.

31 Claims, 3 Drawing Sheets

U.S. PATENT DOCUMENTS

| | | | |
|---|---|---|---|
| 5,396,922 A | 3/1995 | Ottens | |
| 5,913,506 A * | 6/1999 | Kohlstadt et al. | 251/315.15 |
| 5,979,491 A * | 11/1999 | Gonsior | 137/375 |
| 6,161,569 A * | 12/2000 | Gonsior | 137/375 |
| 6,637,455 B1 | 10/2003 | Tappe | |
| 2003/0111113 A1 | 6/2003 | Shih | |
| 2004/0036052 A1 | 2/2004 | Nowak et al. | |

FOREIGN PATENT DOCUMENTS

| | | |
|---|---|---|
| DE | 29518724 U1 | 3/1997 |
| DE | 10238478 A1 | 3/2004 |
| EP | 0575643 A1 | 12/1993 |
| EP | 0623770 A1 | 11/1994 |
| EP | 0756681 B1 | 7/2000 |
| EP | 1121549 B1 | 9/2003 |
| EP | 1104519 B1 | 12/2006 |
| WO | 9529357 A1 | 11/1995 |
| WO | 0011381 A1 | 3/2000 |
| WO | 03/071172 A1 | 8/2003 |

OTHER PUBLICATIONS

English Translation of the International Preliminary Report on Patentability from corresponding Patent Cooperation Treaty Patent Application No. PCT/EP2008/056164 dated Nov. 25, 2009.

* cited by examiner

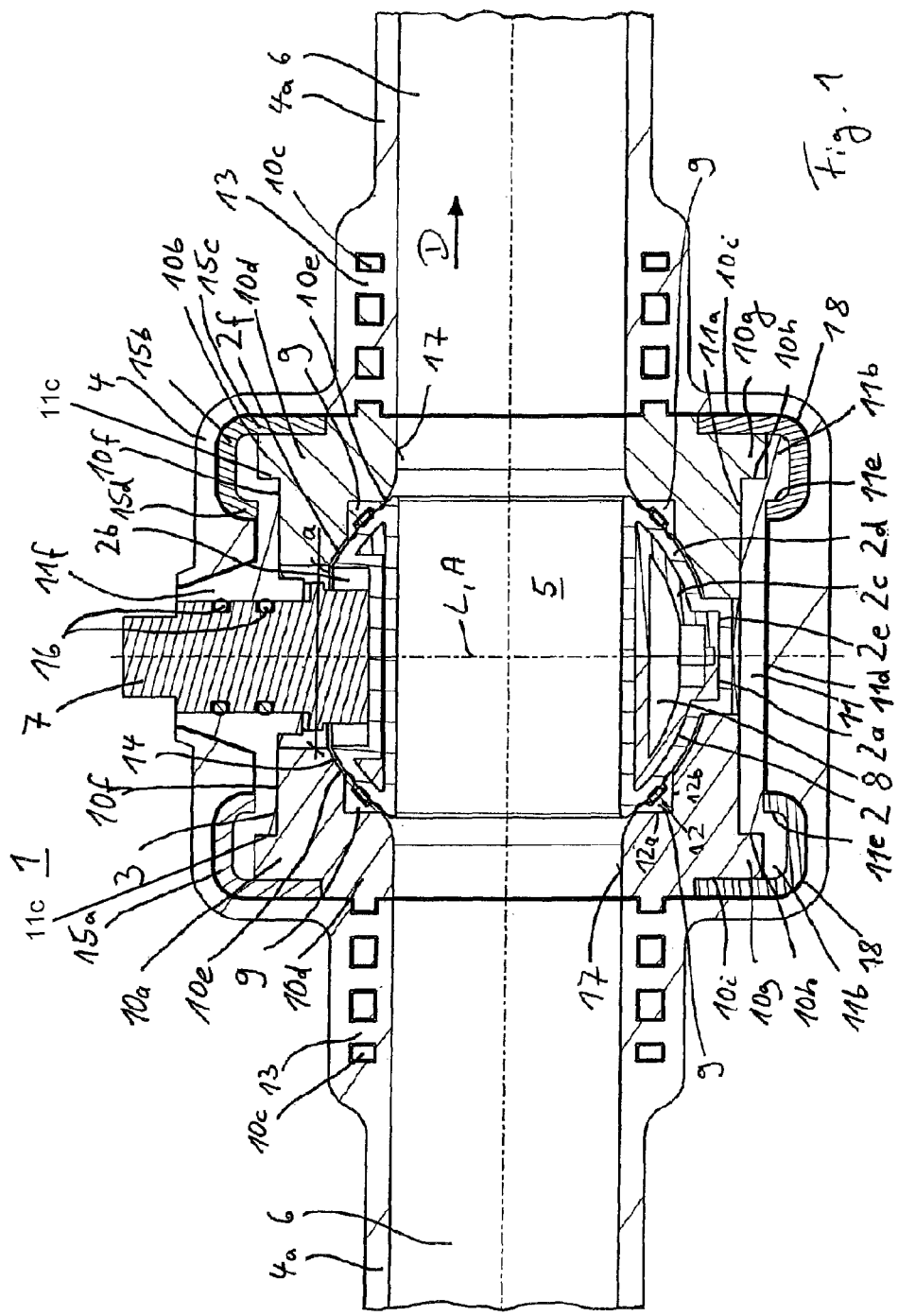

BALL VALVE MADE OF PLASTIC

BACKGROUND OF THE INVENTION

The invention relates to a ball valve having a housing in which there is disposed a support structure which is encased by synthetic material and in which a valve ball having a through-opening is mounted so as to be able to rotate between an open position and a closed position.

A ball valve made from synthetic material and a method for the production thereof are known from the European Patent EP 0 575 643 B1. The ball valve consists essentially of a housing, in which there is mounted a valve ball as a shut-off element. The housing comprises two pipe connection pieces which are connected to each other in a typical manner via the through-bore of the valve ball when the valve ball is in an open position and are separated from each other via the valve ball when the valve ball is in a closed position. The housing is produced in one piece in an injection-molding process and from polyethylene. In order to be able to be rotated from the open position to the closed position, the valve ball is mounted so as to be able to rotate about a substantially—as seen in the case of horizontally aligned pipe connection pieces—vertical axis and is connected to a switching shaft for actuating the valve ball. The valve ball is mounted via two bearing rings which are connected to each other via an annular inlay. The bearing rings comprise openings corresponding to the inner cross-section of the pipe connection pieces and adjoin the valve ball at the front and the rear as seen in the direction of flow of a fluid through the ball valve. When the valve ball is in the open position, its through-bore is aligned with the openings of the bearing rings. As seen in cross-section, the bearing rings are substantially triangular in formation and thus protrude over a portion of the outer peripheral surface of the valve ball. In this region which protrudes over the valve ball a respective sealing ring is provided in the bearing rings and is supported on the outer peripheral surface of the valve ball. Nitrile butyl rubber is preferably provided as the material for the sealing rings. The outer peripheral region of the bearing rings which is remote from the valve ball and is directed in the radial direction is ribbed in formation, wherein the ribs extend in parallel with the through-flow direction of the ball valve. The outer ends of the ribs of the two bearing rings are connected to each other via an annular inlay. The annular inlay is adhered or welded to the bearing rings. The two bearing rings with the sealing rings and the inlay thus form a type of support cage for the valve ball. The bearing rings, the valve ball and the inlay can be produced from bronze, brass, special steel or synthetic material, preferably glass fibre-reinforced synthetic material or polypropylene. In addition, the annular inlay is provided with through-openings, so that during the production process the injected synthetic material of the housing can penetrate through the through-openings in the direction of the valve ball and in the direction of the ribs. The housing synthetic material penetrates as far as to the surface of the valve ball. As a consequence, an intimate connection is established between the material of the housing and the bearing rings and the inlay in the form of an embedded arrangement. The inlay has the task as a type of reinforcement to absorb the tensile, compressive and movement forces and the occurring turning moments within the ball valve.

For the production of the ball valve, in one of the first operating steps the bearing rings together with the sealing rings are placed onto the opposite ends of the valve ball. Subsequently, the annular inlay is slid over the two bearing rings. Then, the annular inlay is connected at its ends to the two bearing rings by an adhesion or welding procedure. This support cage which consists of the valve ball, the bearing rings and the inlay is then inserted into an injection mold and subsequently the support cage is injection-molded around and penetrated by the housing material. In the case of this injection-molding procedure, the through-openings of the inlay have the task of separating the housing produced during the injection-molding procedure into an outer part and an inner part. As the housing produced in the injection-mold is cooled, a shrinking procedure of the two housing parts relative to each other is forced and any shrinkage of the housing in a radial manner inwards is prevented. This should prevent the valve ball from becoming jammed in the housing. In order to achieve some clearance between the valve ball and the synthetic material housing, the valve ball is heated prior to the injection-molding of the housing.

Furthermore, a further shut-off valve made from synthetic material and a method for the production thereof are known from the European Patent 1 121 549 B1. In terms of its basic construction, this shut-off valve corresponds with the above-described ball valve apart from the inlay which connects the two bearing rings together. In accordance with this patent document, the inlay is produced in two steps as an injection-molded part. In a first step, a molded part is produced, which consists preferably of a thermoplastic synthetic material, in particular an adhesion copolymer, and is injection-molded. This molded part forms the outer shape of the inlay and thus also the inner shape of the housing subsequently sprayed from polyethylene. In a second production step, a synthetic material, preferably a glass fibre-reinforced synthetic material or polypropylene, is sprayed from the inside onto the molded part. As this synthetic material is sprayed onto the molded part, the molded part melts partially and a fusion-welded connection is formed between the molded part and the synthetic material introduced in the second method step. The inlay thus consists of a first outer layer of thermoplastic synthetic material, in particular an adhesion copolymer, and a second inner layer of a synthetic material, preferably a glass fibre-reinforced synthetic material or polypropylene. This inlay also comprises the above-described through-openings, so that during the last production step of the shut-off valve the injected polyethylene for the housing can pass through the through-openings of the inlay to the valve ball and, therefore, the inlay is embedded into the housing material.

Furthermore, a ball valve having a valve ball and a bipartite housing is known from the European Patent EP 0 756 681 B1. The housing is divided centrally and—as seen in the through-flow direction—transversely in a plane which centrally bisects an adjusting spindle of the valve ball. The housing halves comprise a recess for receiving a ball valve insert. The ball valve insert is inserted into the bipartite housing during assembly and the two housing halves are clamped together by means of screws. Since the ball valve insert is oversized in comparison with the recess in the housing, sealing is effected by the pretensioning achieved. This ball valve insert consists essentially of the valve ball having a switching shaft and an opposite bearing spigot which on the whole are surrounded by a seamless lining which as seen in the through-flow direction has a flange at the front and rear. Since the lining of the ball valve insert is seamless and continuous from flange to flange and is produced from a fluoric synthetic material such as PFA, PTFE or FEP, the further parts of the ball valve insert do not have any medium contact and do not need to be produced from such high-quality materials. In order to dismantle the valve ball, the lining has to be divided and thus destroyed. The valve ball is rotatable within the lining and lies against the surface of the valve ball and partially against the bearing spigot and the switching shaft. Disposed on the outer side of the lining remote from the valve ball is a resilient inlay around which engages a further housing body of the ball valve insert. The resilient inlay has the task of sealing the lining with respect to the housing body. The housing body can be produced from metal or synthetic material and is then divided in half for assembly purposes. The housing body can also be produced in an undivided manner from injection-molded synthetic material. The processing temperature of the synthetic material of the housing body must then be less than that of the lining and of the resilient inlay. In addition, the lining and the housing body are connected mechanically, in a positive-locking manner or by adhesion by means of an adhesive agent. In order to seal the ball valve insert in the region of the switching shaft, the ball valve insert comprises in addition a pressure piece which is located on the resilient inlay and is pretensioned by a sleeve-shaped pressure flange, which surrounds the switching shaft concentrically, in the direction of the lining until the desired sealing tightness is achieved.

SUMMARY OF THE INVENTION

The present invention provides a ball valve consisting essentially of synthetic material which is characterized by simple production and improved sealing tightness.

In accordance with an aspect of the invention, a ball valve includes a housing consisting essentially of synthetic material, in which there is disposed a support structure which is encased or injection-molded around by the synthetic material of the housing and in which a valve ball having a through-opening is mounted so as to be able to rotate between an open position and a closed position. The support structure includes two opposite support rings, which receive the valve ball, and a connection element which connects these support rings. Simpler production and simplified assembly is achieved by virtue of the fact that the support structure separates the valve ball completely from the synthetic material of the housing. Therefore, a desired amount of clearance in the form of a gap can be adjusted between the outer surface of the valve ball and the inner surface of the support structure merely by virtue of the dimensioning of these components and is not changed during the creation of the housing of the ball valve in the injection-molding process.

The support structure in accordance with the invention together with the valve ball already forms a functional, self-contained ball valve. In order to be able to connect the support structure in a convenient manner to existing pipeline networks which are typically made from polyethylene, the support structure may be injection-molded around with the housing from polyethylene which also forms the connection piece. In the ball valve, the shut-off function is assumed by the support structure with the valve ball and the connection function is assumed by the housing with the connection piece. Since the support structure is closed, it is not necessary for the valve ball to be heated during the injection-molding procedure of the housing. It is only necessary to ensure that the shrinkage force of the housing does not damage the support structure.

When the valve ball is assembled into the support structure, an adjustment of the gap between the outer surface of the valve ball and the inner surface of the support structure may be facilitated by virtue of the fact that bearing surfaces are disposed on the connection element and bearing surfaces are disposed on the support rings such that after the support rings are connected by the connection element the support rings are at a preselected spaced interval with respect to each other, so that a small gap remains between the valve ball and the support rings.

The support structure may be assembled in a convenient manner by virtue of the fact that the support rings inserted from opposite ends into the connection element and the support rings form on a step-like projection a bearing surface which lies against a bearing surface which is formed on a step-like extension of the connection element.

In order to be able to introduce the forces, which act upon the valve ball during operation of the ball valve, in a reliable manner into the support rings, without changing the gap between the valve ball and the support rings significantly, the support rings are inserted into the sleeve-shaped connection element and are each held by a holding part in the inserted position.

The holding part may be formed as a u-shaped clamp having a long limb and a short limb, the long limb being in contact with the support ring and the short limb is supported on the connection element.

To facilitate assembly of the support structure, the annular holding part may be formed in two parts so that it can be opened via a hinge and can be closed via a latching connection.

In order to improve the stability of the connection pieces, it is provided that the support rings on their sides remote from the valve ball may include a tubular connection part which is surrounded by the part of the synthetic material of the housing which forms a connection piece.

The housing may be injection-molded from a thermoplastic synthetic material, in particular polyethylene, polyvinylchloride or an elastomer. The support structure which includes the support rings, the connection element and the holding parts may be injection-molded from a heat-resistant, high-performance, engineering synthetic material, in particular glass fibre-reinforced polyamide. The surfaces which are connected to the housing may be coated with a bonding layer as an adhesive agent and the surfaces of the support structure which are connected to the medium are coated with a medium-resistant protective layer. This support structure can reliably absorb the forces acting upon the valve ball and by reason of the small deformation of the valve ball even under pressure the sealing element remains securely in contact with the valve ball. In this case, the phrase "medium-resistant" is understood to mean that the synthetic materials are not attacked by the substances, such as gases, water, crude oils or chemical products which are carried in the pipelines and thus through the ball valves.

The valve ball may be constructed in the manner of a composite component consisting essentially of a support element and a cover layer, the cover layer completely surrounding the support element and the support element being produced from a heat-resistant, high-performance, engineering synthetic material, in particular glass fibre-reinforced polyamide, and the cover layer being produced from a medium-resistant synthetic material, in particular fluoric synthetic material, polyethylene, polyoxymethylene or an elastomer. By virtue of the fact that the support structure is produced from a high-performance, engineering synthetic material and the valve ball is also very dimensionally stable, on the one hand the sealing tightness of the ball valve is increased and on the other hand neither the support structure nor the valve ball is deformed to an appreciable extent even under high pressures, so that the valve ball continues to be able to move freely in the support structure and therefore no high breakaway torques are required for the switching procedure of the ball valve. The required turning moment is also generally constant over the adjustment range of the valve ball. The composite construction of the valve ball results in a lightweight construction thereof, a reduction in weight and a reduction in materials. Moreover, the cover layers can be adapted in a simple manner to suit the requirements of the medium.

In order to improve the sealing tightness of the ball valve, the contact region between the support rings and the connection element may be sealed or adhered. Therefore, a sealing element may also be disposed in each case between the valve ball and the support rings.

BRIEF DESCRIPTION OF THE DRAWINGS

The invention will be described in more detail hereinafter with reference to an exemplified embodiment illustrated in the drawing, in which FIG. 1 shows a longitudinal sectional view of a ball valve.

DESCRIPTION OF THE PREFERRED EMBODIMENT

Figure 3:
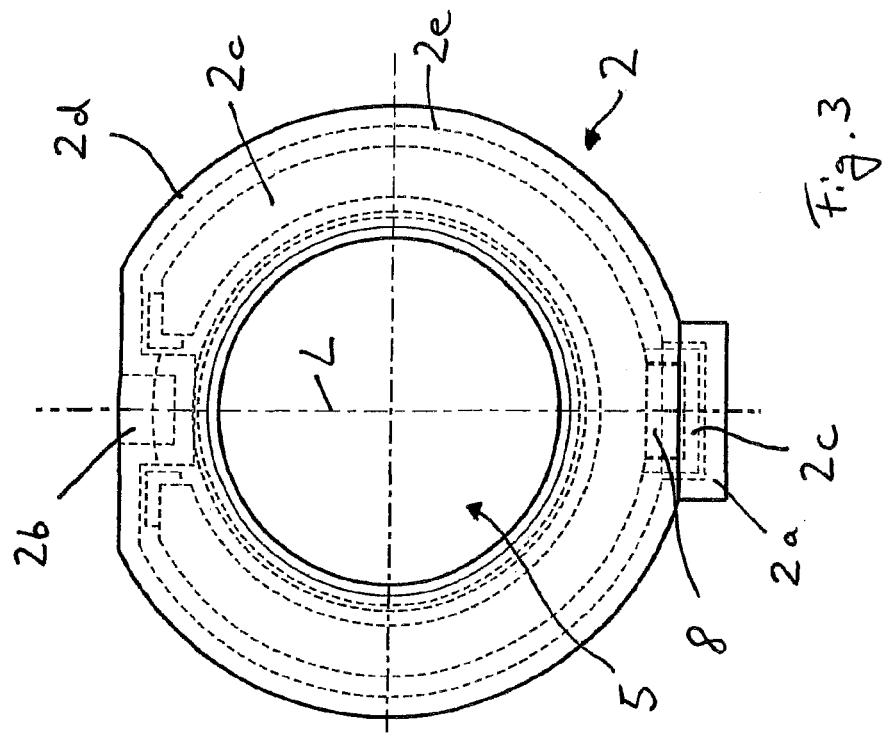
FIG. 3 shows a side view of the valve body of FIG. 2.

FIG. 1 illustrates a longitudinal sectional view of a ball valve 1 in accordance with an embodiment of the present invention. As seen from the inside outwards, the ball valve 1 includes a valve ball 2, a support structure 3 and a housing 4.

Typically, the valve ball 2 which serves as the shut-off element in the ball valve 1 comprises a cylindrical through-opening 5 in the centre. In FIG. 1, the valve ball 2 is illustrated in its open position, in which the through-opening 5 connects together two aligned and mutually opposite connection pieces 4a which form part of the housing 4, so that a fluid is able to flow through the ball valve 1. In order to be able to move the valve ball 2 from its open position to its closed position, the valve ball is mounted in the support structure 3 in such a manner as to be able to rotate about—in the present case—a vertical axis A. For this purpose, the valve ball 2 includes in the region of its lower end a circular spigot 2a, whose longitudinal axis L extends in parallel with the axis A. The longitudinal axis L of the spigot 2a also extends at a right angle with respect to the through-flow direction D of the through-opening 5. Provided at the upper end of the valve ball 2 opposite the spigot 2a is a recess 2b, into which an adjusting spindle 7 engages in a positive-locking manner. By means of this adjusting spindle 7, the valve ball 2 can be moved from the outside from its open position to its closed position or vice versa. The positive-locking connection between the adjusting spindle 7 and the recess 2b can be formed, e.g., as a polygon or Torx-connection and also simply as a slot having a rectangular cross-section.

The valve ball 2, per se, is produced in a hybrid or composite construction. Located in the interior of the valve ball 2, which as a result of the through-opening 5 is substantially sleeve-shaped, is a support element 2c which is produced from a heat-resistant, high-performance, engineering synthetic material, such as, e.g., glass fibre-reinforced polyamide. In order to achieve a lightweight construction of the valve ball 2, this support element 2c comprises where possible enclosed cavities 8 as illustrated, e.g., in the Figure in the region of the spigot 2a. This support element 2c is encased in an injection-molding process with a media-resistant synthetic material in the form of a cover layer 2d, in order to achieve the final shape of the valve ball 2. Possible synthetic materials for the cover layer 2d include fluoric synthetic materials, polyethylene, polyoxymethylene (POM) or elastomers. Prior to spraying on the cover layer 2d, the surface of the support element 2c is prepared with an adhesive agent 2e or primer in the form of a bonding layer. The adhesive agent 2e can also be an injection-molded copolymer. The cover layer 2d surrounds the support element 2c completely, so that the support element 2c does not come into contact with the medium or fluid which is carried through the pipelines and thus through the ball valve 1. A connection can also be established without the adhesive agent 2e. The cover layer 2d comprises approximately a thickness of 5 to 25 mm, preferably 8 to 10 mm and can be machined or processed in another suitable manner, in order to achieve the desired or required roundness of the valve ball 2. The valve ball 2 formed in this manner is characterized by a small charge weight, high resistance with respect to aggressive media and a high degree of dimensional stability. The high degree of dimensional stability ensures that even when high pressure is present at the valve ball 2 in the closed state, breakaway torques produced by a deformation of the valve ball 2 do not make it more difficult for the ball valve 1 to be opened.

The above-described valve ball 2 is mounted in the support structure 3 so as to rotate about the axis A and is sealed with respect to the support structure 3 by a sealing element 9. The support structure 3 is constructed from several components and in particular a first support ring 10a, a sleeve-shaped connection element 11 and a second support ring 10b. The first support ring 10a, the connection element 11 and the second support ring 10b are disposed one behind the other as seen in the through-flow direction D. In other words, the connection element 11 connects the first support ring 10a to the second support ring 10b which is spaced apart therefrom, in order to form the support structure 3 which surrounds the valve ball 2. Each of the two support rings 10a and 10b comprise a connection part 10c which in each case is surrounded by the synthetic material of the connection piece 4a of the housing 4, and a support part 10d which in each case surround in an annular manner the valve ball 2 from opposite ends in the region of their front and rear ends as seen in the through-flow direction D. Also, on their side facing the valve ball 2, the support parts 10d each comprise a circular arc surface 10e which follows the sealing surface 2f of the outer surface of the valve ball 2. Moreover, the support rings 10a and 10b are provided in the region of their connection part 10c with openings 13 in a grid-like fashion, so that the synthetic material of the housing 4 introduced during the injection-molding process can penetrate the connection part 10c and therefore during its formation the connection piece 4a establishes an intimate connection with the connection part 10c of the support rings 10a and 10b.

Furthermore, in each of the support rings 10a and 10b, in the region of their circular arc surface 10c facing the valve ball 2, there is provided a recess 12 which as seen in cross-section is triangular in formation, wherein the annular recess 12 comprises two bearing surfaces 12a and 12b for the sealing element 9 which are aligned with each other at right angles and which are aligned in each case in parallel with the through-flow direction D and perpendicular thereto. Received in this recess 12 is the sealing element 9 which seals the first support ring 10a or the second support ring 10b with respect to the sealing surface 2f of the valve ball 2.

On the whole, each of the two support rings 10a and 10b has a tubular configuration which is cylindrical and grid-like in formation in the region of the respective connection part 10c and in the subsequent support part 10d has an enlarged wall thickness for absorbing the forces acting upon the valve ball 2 during operation, and extends in the direction of the valve ball 2 with its circular arc surface 10e. It is apparent that as a result only a small gap 14 remains between the sealing surface 2f of the valve ball 2 and the circular arc surface 10e of the support rings 10a and 10b and therefore the ball valve 1 as a whole only has a small clearance volume, in the event that media should penetrate beyond the sealing element 9 in the direction of the valve ball 2 or the adjusting spindle 7. The gap 14 has a width of 1/10 min to 5/10 mm.

On the outer side 10f remote from the valve ball 2, the first support ring 10a and the second support ring 10b are substantially cylindrical in formation. However, on this outer side 10f which is remote from the valve ball 2, there is provided on each of the support rings 10a and 10b a projection 10g which extends in a step-like manner outwards and thus forms a bearing surface 10h which is aligned substantially vertically with respect to the through-flow direction D. In order to form the support structure 3, the first support ring 10a and the second support ring 10b are inserted from the ends into the substantially sleeve-shaped connection element 11 which comprises a cylindrical inner side 11a. On its two opposite ends on its inner surface 11a, the connection element 11 also comprises an outwardly directed, step-like extension 11b which forms a bearing surface 11c which is aligned substantially perpendicular to the through-flow direction D. The spaced interval a between the two bearing surfaces 11c thus determines the spacing between the two support rings 10a and 10b inserted into the connection element 11 and thus ultimately the extent of the gap 14 remaining between the circular arc surfaces 10e and the sealing surface 2f of the valve body 2, and of the pretensioning of the sealing element 9 when the valve ball 2 is clamped into the support structure 3.

In order to hold the first support ring 10a and the second support ring 10b in each case in the opposite ends of the connection element 11, two holding parts 15a, 15b are provided which as seen in cross-section are formed in a u-shaped manner and with a long limb 15c and a short limb 15d. When the holding part 15a, 15b is in the installed state, the long limb 15c lies in each case against a holding surface 10i, which is opposite the sealing element 9, and is aligned at a right angle with respect to the through-flow direction D of the ball valve 1 and terminates in a flush manner with an outer surface 11d of the connection element 11. The short limb 15d of the holding part 15a, 15b lies against a counter surface 11e of the connection element 11. This counter surface 11e is likewise aligned at a right angle with respect to the through-flow direction D of the ball valve 1. The clamp-like holding part 15a, 15b thus has the task in each case with its long limbs 15c to urge the first support ring 10a and the second support ring 10b from the outside into the open ends of the connection element 11 until their bearing surfaces 10h come to lie against the bearing surfaces 11c of the connection element. In order to be able to apply this holding force, the holding part 15a, 15b is supported with its short limb 15d against a counter surface 11e of the connection element 11.

For assembly of the holding parts 15a, 15b, provision is made to form them in two parts and to connect in each case one of the two ends together in an articulated manner and to close the other end by means of a type of latching or snap-action connection. In addition to this mechanical clamping of the two support rings 10a and 10b via the connection element 11 by means of the holding part 15a, 15b, provision is made to additionally seal or adhere together the inner surface 11a of the connection element 2a and the outer side 10f of the two support rings 10a and 10b.

In addition, as seen in the through-flow direction D the connection element 11 comprises in the region of its centre a sleeve 11f, in which the adjusting spindle 7 is rotationally mounted and is sealed by sealing rings 16. This sleeve 11f is aligned with its longitudinal extension at a right angle with respect to the through-flow direction D.

The support structure 3 which is formed substantially from the first support ring 10a, the connection element 11, the second support ring 10b and the two holding elements 15a, 15b is produced essentially in the injection-molding process from so-called high-performance, engineering synthetic materials which are characterized by a high degree of strength and heat resistance at the same time. For example, reference is made here to glass fibre-reinforced polyamide. When using polyamide, the regions of the surfaces of the support structure 3 are coated with a protective layer 17 which can come into contact with the medium in the pipelines, not illustrated, and thus in the ball valve 1. An adhesive agent or preferably an injection-molded copolymer can be used as the protective layer 17. Moreover, all of the surfaces, preferably the outer surfaces of the support structure 3 are surrounded by an adhesive agent 18 or preferably an injection-molded copolymer as a bonding layer, in order to establish an intimate connection between the synthetic material of the housing 4 and the support structure 3.

Therefore, the adhesive agent 18 begins in the region of the outer side of the sleeve 11f and continues in the region of the outer surface 11d of the connection element 11, then surrounds the short limb 15d of the holding part 15a, 15b and then passes into the long limb 15c of the holding part 15a, 15b where it impinges upon the connection part 10c of the support rings 10a and 10b.

It is evident that the support structure 3 and thus also the adhesive agent 18 surround the valve ball 2 completely and there are no openings, in which synthetic material of the housing 4 can penetrate in the direction of the valve ball 2 during the injection-molding procedure. The support structure 3 and the valve ball 2 thus already form a sealed and functional ball valve 1.

In the final production step of the ball valve 1, the support structure 3 together with the valve ball 2 and the adjusting spindle 7, which are surrounded by the adhesive agent 18, are inserted into an injection-mold and the housing 4 is produced by injection-molding around the aforementioned parts with a thermoplastic resin, preferably polyethylene, polyvinylchloride or elastomers. The housing 4 has the task of protecting the support structure 3 against any mechanical and chemical loads, as the high-performance materials of the support structure 3 are generally not very resistant. In the present case, the connection pieces 4a comprise an opening 6, whose opening cross-section corresponds to that of the through-opening 5 of the valve ball 2. In the region of the connection pieces 4a, the thermoplastic resin used also renders it possible to weld and press the pipelines, which are to be connected and are not illustrated, or to connect threads which are to be cut in via the outer surfaces of the connection pieces 4a.

The term "adhesive agent" or "primer" refers to thin layers in the μm-range which are applied in the flame spraying process, plasma process, whirl sintering process from a suitable material, such as, e.g., synthetic material powder, synthetic material powder as an emulsion in a suitable solvent. The material of the adhesive agent generally consists of materials (synthetic materials) which are compatible with the materials which are to be bonded. Adhesive bonding is performed by effects such as adhesion, diffusion of the molecular structure and/or formation of hydrogen bonds.

Figure 2:
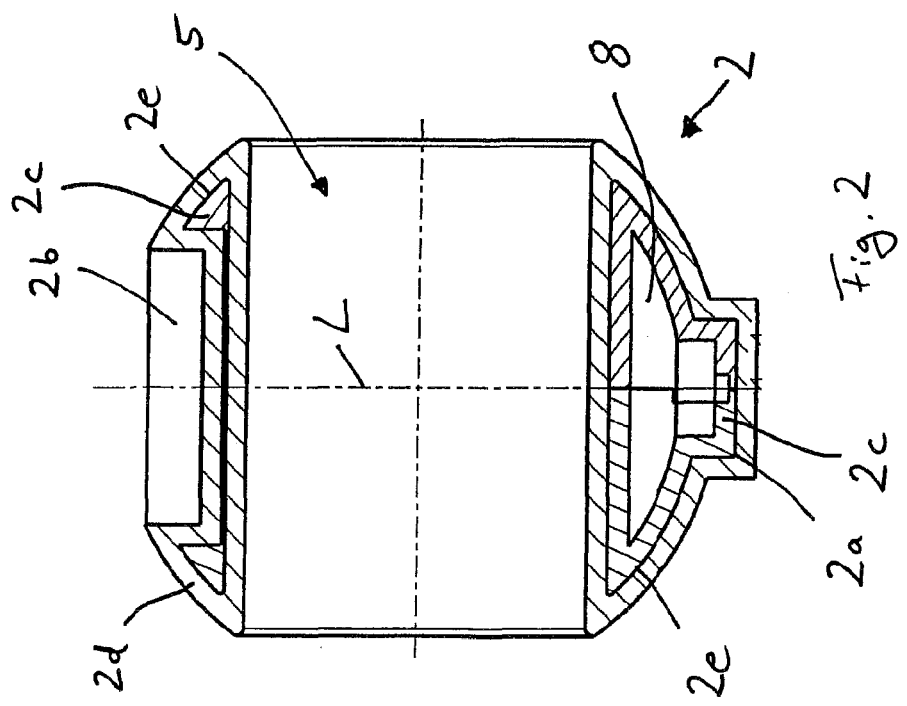
FIG. 2 shows a detailed view of the valve body of the ball valve of FIG. 1.

FIG. 2 illustrates a detailed view of the valve body 2 of the ball valve of FIG. 1, showing clearly the above-described division of the valve body 2 into a support element 2c, a bonding layer 2e and a cover layer 2d. In the region of the projection 2a, the frame-like support element 2c provides adequate stability so that in addition a weight reduction can be achieved via a cavity 8 within the support element 2c.

FIG. 3 illustrates a side view of FIG. 2.

The embodiment of the synthetic material valve ball is considered as an independent inventive idea. Improved dimensional stability of a synthetic material valve ball of a ball valve, which has a through-opening and can be mounted in a housing of the ball valve so as to be able to rotate between an open and a closed position, may be achieved by constructing the valve ball in the manner of a composite component from a support element and a cover layer. As a consequence, it is possible in the valve ball to combine the characteristics of high dimensional stability provided by the support element and effective resistance against media provided by the cover layer. Effective dimensional stability ensures that the valve ball is deformed only slightly even under high operating pressures and can therefore also be rotated in an effective manner from the closed position to the open position within the housing of the ball valve, without having to overcome high breakaway torques in relation to the valve ball. The required turning moment is also constant over the adjustment range of the valve ball. The composite construction of the valve ball results in its lightweight construction, a weight reduction and a reduction in material.

Valve balls having a large diameter can also be injection-molded. They do not have to be produced from an extruded semi-finished product. In order to achieve the effective resistance against media, the cover layer surrounds the support element completely. Moreover, the cover layers can be conveniently adapted to suit the requirements of the medium. In a particularly advantageous manner, it is provided that the support element is produced from a heat-resistant, high-performance, engineering synthetic material, in particular glass fibre-reinforced polyamide, and the cover layer is produced from a medium-resistant synthetic material, in particular fluoric synthetic material, polyethylene, polyoxymethylene, elastomer or synthetic thermosetting materials such as rubber and the surfaces of the support element connected to the cover layer are coated with a bonding layer as an adhesive agent. A lightweight construction of the valve ball is achieved by virtue of the fact that the support element comprises at least one enclosed cavity. In order to ensure that the valve ball is guided effectively and can be adjusted conveniently, a spigot which protrudes outwardly is disposed on one end and a recess for receiving an adjusting spindle is disposed on the opposite end of the valve ball. It is provided that a cavity may be disposed in the region of the spigot.

Figure 4:
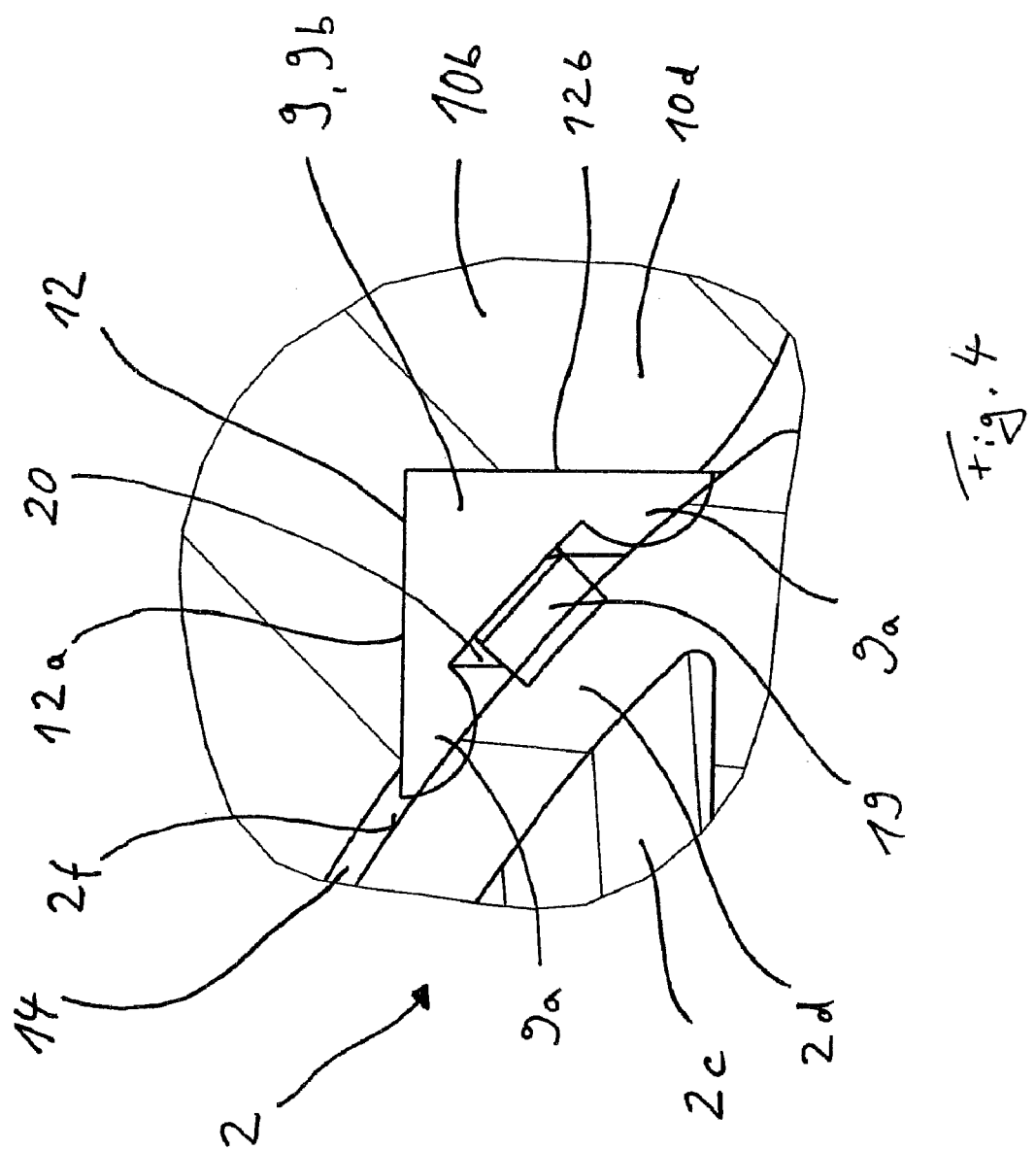
FIG. 4 shows an enlarged detailed view of a sealing element of the ball valve of FIG. 1.

FIG. 4 illustrates an enlarged detailed view of a sealing element 9 of the ball valve 1 as shown in FIG. 1. FIG. 4 illustrates clearly the cross-section of the annular sealing element 9 in the form of a profile seal. The sealing element 9 is made up of two sealing bodies 9a which are connected to each other via a carrier element 9b. The sealing bodies 9a are each semi-circular as seen in cross-section, have the function of sealing lips or are comparable to O-rings, as their semi-circular outer contour is in contact with the sealing surface 2f of the valve ball 2. As seen in the direction of action of the sealing element 9—i.e., starting from the region of the ball valve 1, which carries the medium, towards the adjusting spindle 7 of the ball valve 1—the two sealing bodies 9a are disposed one behind the other and spaced apart from each other. As seen from the second support ring 10b in the direction of the sealing surface 2f of the valve ball 2, the two sealing bodies 9a protrude from the carrier element 9b, so that a recess 20 is present between the sealing bodies 9a. Disposed centrally in this recess 20 between the two sealing bodies 9a is an annular storage element 19 which has a rectangular cross-section and is produced preferably from a polyamide fibre pad. Other synthetic materials can also be used. It is also feasible to form the storage element 19 as a brush or foam, e.g., consisting of bronze in order to dissipate static charges. The storage element 19 has the task of accommodating fine particles which have penetrated through underneath the first sealing body 9a and thus to protect the second sealing body 9a therefrom. This enhances the sealing tightness of the second sealing body 9a. Moreover, the storage element 19 which is formed as a fibre pad is impregnated or filled with a lubricant. Preferably, a fluorine-containing lubricant is used. Since the lubricant filling is protected by the two sealing bodies 9a, it is not carried off by the medium and therefore a ball valve can be put into operation again even after years of idleness without experiencing any adhesion effects. The lubricant also aids the reception and retention of the particles.

FIG. 4 illustrates the sealing bodies 9a and the storage element 19 in each case in their unstressed form, in order to show their original form. Of course, the sealing bodies 9a and the storage element 19 are compressed in the installed state and lie against the sealing surface 2f.

As seen in cross-section, the sealing element 9 has essentially the shape of a right-angled triangle, wherein the sealing bodies 9a protrude in the region of the ends of the hypotenuse. The two catheters are in contact with the bearing surfaces 12a, 12b of the recess 12 in the support ring 10b.

The two sealing bodies 9a, the carrier element 9b and the storage element 19 are formed in one piece in the illustrated embodiment. The sealing bodies 9a and the carrier element 9b are produced in an injection-molding process from an elastomer, in particular nitrile butyl rubber, wherein the storage element 19 is connected to the sealing bodies 9a and the carrier element 9b during the injection-molding process.

In a further production step, the sealing element 9 is then inserted into the mold for the first or second support ring 10a, 10b and is then injection-molded around by the synthetic material of the support rings 10a, 10b.

The embodiment of the sealing elements is considered as an independent inventive idea. Simplified production and improved sealing tightness in the case of a ball valve having a housing consisting of synthetic material, in which a valve ball having a through-opening is mounted so as to be able to rotate between an open position and a closed position, wherein the valve ball is sealed with respect to the housing via annular sealing elements, can be achieved by ensuring that the sealing elements in each case comprise two sealing bodies which are in contact with the valve ball. The connection of the sealing bodies to the support ring is facilitated by virtue of the fact that the sealing bodies of a sealing element are connected to each other via a carrier element. An improvement in the sealing effect is achieved by virtue of the fact that the sealing bodies of a sealing element are disposed one behind the other and spaced apart from another as seen in the direction of action of the sealing element. The sealing effect is also aided by virtue of the fact that, as seen in cross-section and in the contact region with the valve body, the sealing bodies are formed in a semi-circular fashion in the manner of an O-ring. Impurities are removed from the medium, which has passed the first valve body, by virtue of the fact that between the sealing bodies of a sealing element there is disposed a storage element which is in contact with the valve body. Therefore, the action of the second sealing body is not impaired by the impurities. The storage element may be cuboidal in the form of a fibre pad consisting of polyamide. The housing may be provided with annular recesses, in which sealing elements are inserted, the recesses having two bearing surfaces disposed at right angles with respect to each other and, as seen in cross-section, the sealing elements having substantially the shape of a right-angled triangle. The sealing bodies may protrude from the housing in the direction of the valve body. Handling of the sealing element is facilitated by virtue of the fact that each sealing element is formed in one piece with the sealing bodies and is produced from an elastomer, in particular nitrile butyl rubber. It is provided that each sealing element is mounted in the housing via a support structure consisting of two opposite support rings which receive the valve ball. This support structure has a high degree of dimensional stability, so that the sealing element has to compensate for small deformations only.

Changes and modifications in the specifically described embodiments can be carried our without departing from the principles of the present invention, which is intended to be limited only by the scope of the appended claims, as interpreted according to the principles of patent law including the doctrine of equivalents.

The invention claimed is:

1. Ball valve, comprising:
a housing consisting essentially of synthetic material and a support structure which is encased by the synthetic material;
a valve ball having a through-opening is mounted in said housing so as to be able to rotate between an open position and a closed position;
wherein the support structure includes two opposite support rings that receive the valve ball and a sleeve-shaped connection element that connects said support rings, wherein the support structure separates the valve ball from the synthetic material of the housing;
wherein the support structure is injection molded around by the synthetic material of the housing, first bearing surfaces are disposed on the connection element and second bearing surfaces are disposed on the support rings such that with the support rings being connected by the connection element, the support rings are at a preselected spaced interval with respect to each other, so that a gap remains between the valve ball and the support rings, the support rings being inserted into the sleeve-shaped connection element and are each held in an inserted position by a holding part and the contact region between the support rings and the connection element is sealed or adhered.

2. Ball valve as claimed in claim 1, wherein the support rings are inserted from opposite ends into the connection element and the support rings form on a step-like projection, said second bearing surface which lies against said first bearing surface which is formed on a step-like extension of the connection element.

3. Ball valve as claimed in claim 1, wherein the holding part is formed as a u-shaped clamp having a long limb and a short limb, the long limb being in contact with the support ring and the short limb being supported on the connection element.

4. Ball valve as claimed in claim 1, wherein the holding part is formed in two parts, can be opened via a hinge and can be closed via a latching connection.

5. Ball valve as claimed in claim 1, wherein the support rings have sides remote from said valve ball that comprise a tubular connection part which is surrounded by the part of the synthetic material of the housing which forms a connection piece.

6. Ball valve as claimed in claim 1, wherein the housing is injection molded from a thermoplastic synthetic material, the support structure which consists of the support rings, the connection element and the holding parts being injection molded from a heat-resistant, high-performance, engineering synthetic material, wherein surfaces of the support structure which are connected to the housing are coated with an adhesive agent as a bonding layer and the surfaces of the support structure which are connected to the medium are coated with a medium-resistant protective layer.

7. Ball valve as claimed in claim 6, wherein the valve ball is constructed in the manner of a composite component from a support element and a cover layer, the cover layer surrounds the support element completely and the support element is produced from a heat-resistant, high-performance, engineering synthetic material, and the cover layer is produced from a medium-resistant synthetic material.

8. Ball valve as claimed in claim 1, including a sealing element is disposed between the valve ball and the support rings.

9. Ball valve as claimed in claim 2, wherein the holding part is formed as a u-shaped clamp having a long limb and a short limb, the long limb being in contact with the support ring and the short limb being supported on the connection element.

10. Ball valve as claimed in claim 9, wherein the holding part is formed in two parts, can be opened via a hinge and can be closed via a latching connection.

11. Ball valve as claimed in claim 10, wherein the support rings have sides remote from said valve ball that comprise a tubular connection part which is surrounded by the part of the synthetic material of the housing which forms a connection piece.

12. Ball valve as claimed in claim 11, wherein the housing is injection-molded from a thermoplastic synthetic material, the support structure which consists of the support rings, the connection element and the holding parts being injection-molded from a heat-resistant, high-performance, engineering synthetic material, wherein surfaces of the support structure which are connected to the housing are coated with an adhesive agent as a bonding layer and the surfaces of the support structure which are connected to the medium are coated with a medium-resistant protective layer.

13. Ball valve as claimed in claim 12, wherein the valve ball is constructed in the manner of a composite component from a support element and a cover layer, the cover layer surrounds the support element completely and the support element is produced from a heat-resistant, high-performance, engineering synthetic material, and the cover layer is produced from a medium-resistant synthetic material.

14. Ball valve as claimed in claim 1, wherein said valve ball comprising a through-opening and is configured to be mounted in the housing of the ball valve so as to be able to rotate between an open and a closed position, wherein said valve ball constructed as a composite component from a support element and a cover layer.

15. Ball valve as claimed in claim 14, wherein the cover layer surrounds the support element completely.

16. Ball valve as claimed in claim 14, wherein the support element is produced from a heat-resistant, high-performance, engineering synthetic material, and the cover layer is produced from a medium-resistant synthetic material and surfaces of the support element connected to the cover layer are coated with a bonding layer as an adhesive agent.

17. Ball valve as claimed in claim 14, wherein the support element comprises at least one enclosed cavity.

18. Ball valve as claimed in claim 14, including a spigot which protrudes outwardly on one end and a recess for receiving an adjusting spindle on the opposite end of the valve ball.

19. Ball valve as claimed in claim 18, including a cavity defined in the region of the spigot.

20. Ball valve as claimed in claim 1 including annular sealing elements sealing the valve ball with respect to the housing, each of said sealing elements comprising two sealing bodies which are in contact with the valve ball.

21. Ball valve as claimed in claim 20, wherein the sealing bodies of each sealing element are connected to each other via a carrier element.

22. Ball valve as claimed in claim 20, wherein the sealing bodies of each sealing element are disposed one behind the other and spaced apart from another as seen in the direction of action of the sealing element.

23. Ball valve as claimed in claim 20, wherein the sealing bodies are formed in a semi-circular fashion in the manner of an O-ring when viewed in cross-section and in the contact region with the valve ball.

24. Ball valve as claimed in claim 20, including a storage element between the sealing bodies of a sealing element, said storage element being in contact with the valve ball.

25. Ball valve as claimed in claim 24, wherein the storage element is cuboidal in shape and is a fibre pad consisting essentially of polyamide.

26. Ball valve as claimed in claim 20, wherein the housing is provided with annular recesses, in which the sealing elements are inserted, the recesses comprising two bearing surfaces disposed at right angles with respect to each other and, wherein the sealing elements have substantially the shape of a right-angled triangle when viewed in cross-section.

27. Ball valve as claimed in claim 20, wherein the sealing bodies protrude from the housing in the direction of the valve ball.

28. Ball valve as claimed in claim 20, wherein each sealing element is formed in one piece with the sealing bodies and is produced from an elastomer.

29. Ball valve as claimed in claim 20, wherein each sealing element is mounted in the housing via a support structure comprising two opposite support rings which receive the valve ball.

30. Ball valve as claimed in claim 6, wherein said thermoplastic synthetic material comprises polyethylene or polyvinylchloride or an elastomer and wherein said heat-resistant, high-performance, engineering synthetic material comprises glass fibre-reinforced polyamide.

31. Ball valve as claimed in claim 7, wherein said high-performance, engineering synthetic material comprises a glass fibre-reinforced polyamide and wherein said medium-resistant synthetic material comprises fluoric synthetic material, polyethylene, polyoxymethylene, elastomer or synthetic thermosetting materials.

* * * * *

UNITED STATES PATENT AND TRADEMARK OFFICE
CERTIFICATE OF CORRECTION

PATENT NO. : 8,360,092 B2
APPLICATION NO. : 12/601395
DATED : January 29, 2013
INVENTOR(S) : Michael Tappe It is certified that error appears in the above-identified patent and that said Letters Patent is hereby corrected as shown below:

In the Specifications:

<u>Column 6</u>
Line 18, "more," should be --more--

<u>Column 7</u>
Line 6, "1/10 min" should be --1/10 mm--

In the Claims:

<u>Column 12</u>
Line 11, "material," should be --material--
Line 43, "material," should be --material--
Line 55, "material," should be --material--

Signed and Sealed this
Twenty-first Day of May, 2013

Teresa Stanek Rea
*Acting Director of the United States Patent and Trademark Office*